United States Patent [19]

Hosoda et al.

[11] 3,797,770

[45] Mar. 19, 1974

[54] AUTOMATIC CASSETTE TAPE WINDING APPARATUS

[75] Inventors: Masayuki Hosoda; Kimitaka Kassai, both of Tokyo, Japan

[73] Assignee: Otari Electric Company Ltd., Tokyo, Japan

[22] Filed: Mar. 30, 1972

[21] Appl. No.: 239,553

[30] Foreign Application Priority Data

Apr. 1, 1971 Japan ............................... 46-19865

[52] U.S. Cl. ........... 242/56 R, 156/506, 242/67.3 R

[51] Int. Cl. ........................ B65h 19/20, B65h 17/02

[58] Field of Search ....... 242/56 R, 58.1, 58.4, 58.5, 242/59, 67.3 R; 156/502, 504, 505, 506

[56] References Cited

UNITED STATES PATENTS 3,637,153 1/1972 King ................................. 242/56 R 3,693,900 9/1972 Bohn ................................. 242/56 R

*Primary Examiner*—John W. Huckert

*Assistant Examiner*—Edward J. McCarthy

*Attorney, Agent, or Firm*—Martin Smolowitz

[57] ABSTRACT

In a tape winding apparatus the start of the recording is sensed to start the tape take-up rollers, a leader tape is spliced with the recorded tape and the recorded portion is automatically wound into a cassette while the unrecorded excess portion of the leader tape is removed, the end of recording is sensed and the tape is automatically cut, wound into the cassette and coupled with the leader tape.

6 Claims, 9 Drawing Figures

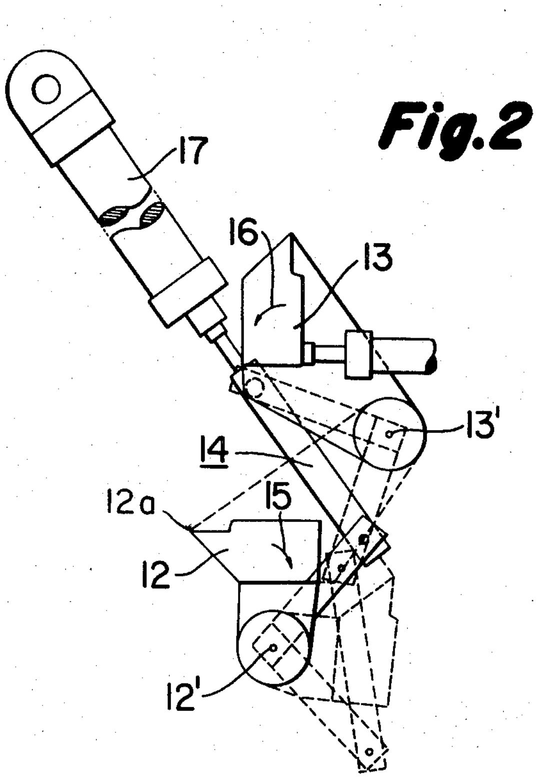
Fig.2
Fig.4(b)
Fig.3
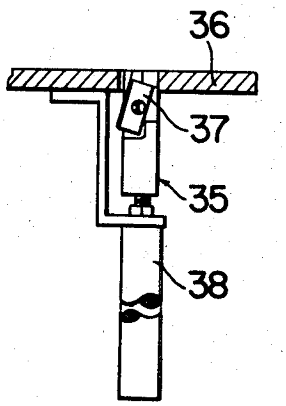
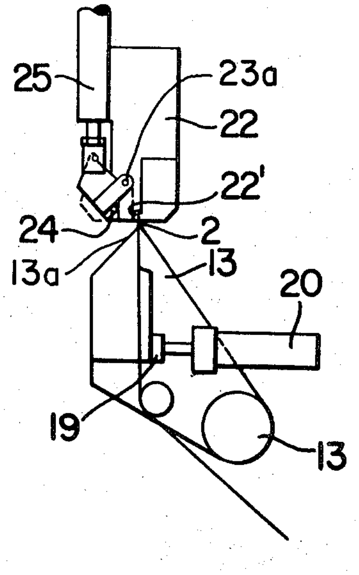

AUTOMATIC CASSETTE TAPE WINDING APPARATUS

FIELD OF THE INVENTION

This invention relates to a cassette tape automatic winding apparatus in which a printed cassette tape wound on a master reel is automatically supplied to a cassette pack containing a tape leader and wound on a shaft provided therein.

BACKGROUND OF THE INVENTION

Up until the present invention, the loading of a printed cassette tape wound on a master reel into a cassette pack was achieved by manual operation consisting of numerous and complicated steps. It follows that such manual operation is extremely troublesome and expensive.

It is the main object of the present invention to overcome the disadvantages of prior art arrangements. It is, therefore, the main object of the present invention to provide a cassette tape winding apparatus in which the loading operation of the cassette tape is performed automatically.

It is another object of the present invention to provide a cassette tape winding apparatus of the last-mentioned type in which an unrecorded portion of the tape is automatically removed simultaneously with the loading operation.

Other objects and features of the invention will become more readily apparent from the following description of a preferred embodiment thereof with reference to and as illustrated in the attached exemplary drawings, in which:

BRIEF DESCRIPTION OF THE DRAWINGS

FIG. 2 is a fragmentary view illustrating the operations of a tape leader supporting area and a tape supporting are which are component parts of the apparatus;

FIG. 3 is a fragmentary view illustrating the construction of a cutter mechanism which is also a component part of the apparatus;

FIGS. 4*a* to 4*f* illustrate diagrammatically the operation of the apparatus.

DESCRIPTION OF THE PREFERRED EMBODIMENT

The preferred embodiment of the present invention includes an automatic cassette tape winding apparatus comprising a master reel having a recorded tape wound thereon, means for removing and guiding the recorded tape from said master reel, means for detecting a position signal on the tape and stopping running of the tape at a predetermined position responsive to the detected signal, means for collecting an excessive portion of the tape, a cassette pack having a leader tape contained therein, means for receiving said cassette pack, take-up means provided in said cassette pack for said tape, a fixed support for supporting said leader tape, a leader tape supporting arm, means for interlocking said leader tape supporting arm with said fixed tape support, a tape supporting arm, means for selectively interlocking said tape supporting arm with said leader tape supporting arm, a member for holding the tape provided on said tape supporting arm, means for catching the tape supported by said tape supporting arm and arranging an excessive portion of the tape in a zigzag form to remove the excessive portion, a member mounted proximate to said fixed tape support adapted to sever any excessive tape portion and, an adhesive tape supply means for cutting such adhesive tape used to connect the tape with the leader tape into a piece of predetermined length and supplying the cut-off piece of adhesive tape by pressing it to the tape and the leader tape.

Figure 1:
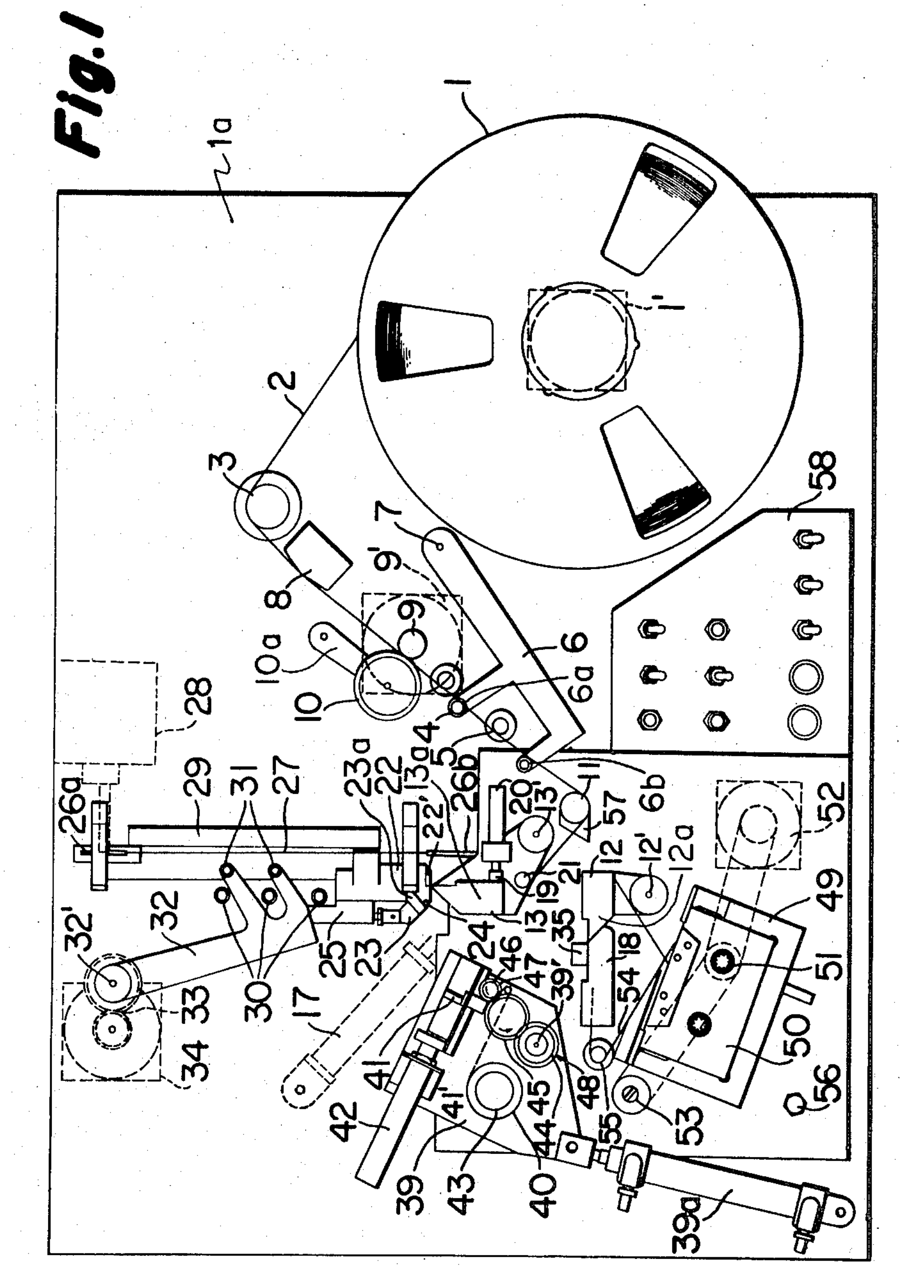
FIG. 1 is a front view of a preferred embodiment of the present invention.

According to FIG. 1, a master reel 1 has a recorded cassette tape 2 wound thereon in convolutions of a predetermined number. A drive motor 1' is mounted on the lower part of a reel shaft to the master reel 1 for applying a back tension to the tape 2. Guide rollers 3, 4 and 5 are fixedly mounted on side plate **1*a* to guide the tape 2 as it is being unwound from the master reel 1. A tension arm 6 is pivotally mounted on the plate at a pivot 7. The tension arm 6 has two arm portions carrying rollers 6*a* and 6*b* at the ends thereof and imparts a predetermined tension to the running tape 2. Rollers 6*a* and 6*b* are in contact with tape 2 on both sides of the guide roller 5 (in the running direction of the tape) enabling the tape to press against the guide roller 5. A signal detection head 8 is provided between the guide roller 3 and the guide roller 4 along the running path of the tape 2 and serves to detect a signal that indicates the starting point of the recording on the tape 2; such starting signal is recorded on the tape 2** at a predetermined position before the starting end of the recorded portion for each cassette.

A capstan 9 projects upwardly through the plate **1*a* at a position between the signal detection head 8 and the tension arm 6. The capstan 9 is driven by a drive motor 9' which is provided on the rear side of the plate 1*a*. A pinch roller 10 is rotatably mounted on the plate 1*a* by means of an arm 10*a* attached thereto; such pinch roller 10 is in contact with capstan 9 as the tape 2 runs therebetween during movement of the tape. A fixed guide roller 11 is fixedly mounted for guiding the tape 2 which has passed over the tension arm 6. A leader tape supporting arm 12 having a projecting portion 12*a* at one end is rotatable about a pivot 12' and a tape supporting arm 13 also having a projecting end portion 13*a* is rotatable about a pivot 13'. The arms 12 and 13 are associated with each other through a link mechanism 14 as shown in detail in FIG. 2. As the arm 12 rotates in the direction of the arrow 15, the arm 13 rotates in the direction of the arrow 16. The aforementioned movement of the arms 12 and 13 are caused by actuation of a tape end switching cylinder 17. A fixed tape support 18 is secured at a position at which the side surfaces of the projecting end portions of the arms 12 and 13 engage one side surface of the tape support 18 when arms 12 and 13 are rotated to a predetermined position each. The side surfaces of the leader tape supporting arm 12 and the fixed tape support 18 which contact the tape 2 are respectively formed with a plurality of suction orifices (not shown) which are placed under vacuum when it is necessary to draw the tape to the arms 12 and 13**.

A tape pad 19 holds the tape 2 to the side surface of the tape supporting arm 13 and is capable of moving back and forth by means of a cylinder 20 mounted on the tape supporting arm 13. A guide roller 21 is also mounted on the tape supporting arm 13 for guiding the tape 2. A movable tape carrier 22 has a tape catching arm 23 which is rotatable about a pivot 23*a;* such catching arm 23 is provided at the foremost end thereof with a pad 24. The tip of the tape 2 is urged to the side surface of the tape supporting arm 13 disposed between the pad 24 and a side surface of an uplift 22' mounted opposite to the pad 24. Rotation of the tape catching arm 23 is caused by actuation of cylinder 25 which is mounted on the movable tape carrier 22. In turn, the carrier 22 is fixed to a chain 27 which is positioned around sprockets 26*a* and 26*b;* the sprocket 26*a* is rotated by a motor 28; actuation of the motor 28 causes the carrier 22 to move in a reciprocating motion and the stroke of the reciprocating motion is controlled by the provisions of suitable stoppers at both ends thereof. A plurality of guide pins 30 are provided in parallel with the chain 27. Such guide pins 30 emerge from and disappear into the plate 1*a*. A forked shaped tape pulling arm 32 which is pivotally mounted on a pin 32' has guide pins 31 at the foremost ends of its forked arm portions. The tape pulling arm 32 is swingable about the pin 32' by means of a reversible motor 34, the rotation of which is transmitted to the tape pulling arm 32 through a transmission gear 33. The guide pins 31 move by the rotation of the arm 32 located in between the guide pins 30 in a horizontal plane such that pins 30 assume the position shown in FIG. 1. The guide pins 31 are arranged to form a zigzag configuration with the guide pins 30 pulling on the tape as hereinafter described in connection with FIG. 4d.

A cutter mechanism 35 is provided adjacent to the portion of the fixed tape support 18 which engages the tape supporting arm 12. As shown in FIG. 3, the cutter mechanism 35 includes a cutter 37 which can emerge from and submerge below a plate 36 and a cylinder 38 for driving the cutter 37 which is mounted on the rear surface of the plate 36. The cutter 37 is mounted at an inclination relative to the axis of the cutter mechanism 35 such that the cutter 37 cuts across the tape 2 from one side edge thereof to the other. An adhesive tape supply arm 39 is pivotally mounted on a pin 39'. A pusher 41 driven by cylinder 42, supplies an adhesive tape 40' which has been cut to a predetermined length required for a single connecting operation. A cutter 41' is provided adjacent the pusher 41 and projects from the portion of the pusher 41 which presses the adhesive tape. An outlet for the adhesive tape is provided on the arm 39 at a position which is opposite to the portions of the leader tape receiving arm 12 and the fixed tape support 18 engage each other when the arm 39 is pivoted to a predetermined position. A reel 43 for receiving the wound adhesive tape 40 is mounted on the arm 39. The adhesive tape 40 as unwound from the reel 43 is supplied to the pressing portion of the pusher 41 in a predetermined length by means of an adhesive tape supply mechanism consisting of a sun gear 44 disposed concentrically with the pin 39'; a transmission gear 45 which meshes with the sun gear 44; a planetary gear 46 which meshes with the sun gear 44 and a feed roller 47 which is provided integrally with the planetary gear 46. The sun gear 44 is rotatable in one direction only by provision of a one-way clutch (not shown) coupled thereto. The sun gear 44 is not rotated when the arm 39 does rotate in a counterclockwise direction and thereby enables the feed roller 47 to rotate. A frame 49 for receiving a cassette pack 50 has a take-up shaft 51 on which the hub of the cassette pack 50 fits. The shaft 51 is driven and rotated by a motor 52; such motor 52, also drives a tape removing roller 53 via take-up shaft 51. The cassette pack 50 contains a leader tape 54 (about 50cm in length) which is passed around the leader tape supporting arm 12, the fixed tape support 18 and a guide roller 55 in a crossing belt fashion. When a push button switch 56 is actuated, the take-up shaft 51 is slowly rotated through a suitable driving mechanism and a stopper 57 is provided for the tape supporting arm 13. The apparatus has a control board 58 on which various control switches are provided. A cutter 59 (FIG. 4*d*) is provided for cutting off the unnecessary tape. The cutter 59 is moved back and forth by a cylinder 60.

Figure 4A:
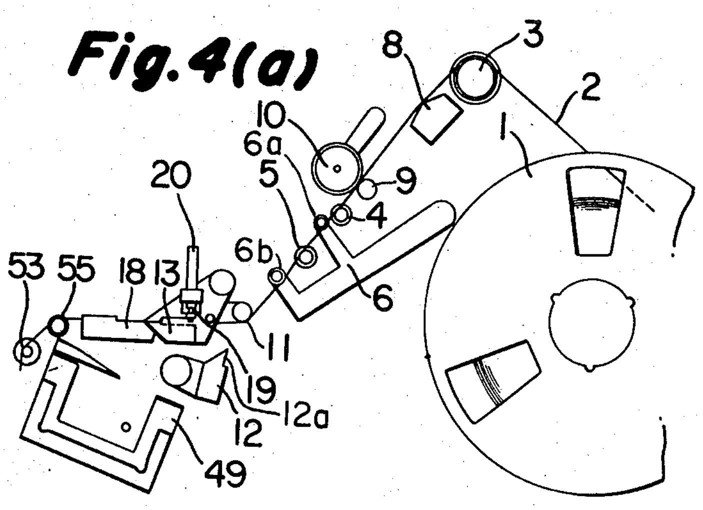

A typical operation of the apparatus according to the present invention is described below:

An initial run of the apparatus is required prior to the start of a normal run or operation in order to detect the starting portion of the recorded part of the tape 2 in the event a new reel 1 is loaded into the apparatus. When reel 1, take-up shaft 51 and capstan 9 are not in motion and the pinch roller 10 is at a rest position, the cylinder 17 advances to switch the positions of the tape leader supporting arm 12 and the tape supporting arm 13, in a manner enabling the tape supporting arm 13 to engage the fixed tape support 18 while the pressure pad 19 is retracted via cylinder 20. Next, the end of the tape 2 wound on the reel 1 is guided along the guide roller 3, head 8, capstan 9, guide rollers 4, 5 and 11, the tape supporting arm 13, the fixed tape support 18 and the guide roller 55 and, is fixed to the tape removing roller 53 as shown in FIG. 4a. The pinch roller 10 is then pivoted to engage the capstan 9 over the tape 2. When the motors 9', 1' and 52 are started simultaneously, the roller 53 is rotated and the tape 2 is wound on the roller 53. When the head 8 detects a stop signal recorded on the tape 2, the pinch roller 10 is pivoted to its non-operable position through operation of an audio-sensing amplifier and the motors 1', 9' and 52 are stopped. Next, the pressure pad 19 is advanced by means of the cylinder 20 to urge the tape 2 against the arm 13. At this stage, the cutter 37 is moved upwardly by means of cylinder 38; thereby severing the tape by means of cutter 37; thereafter, once cutting is completed the cutter 37 is retracted. Next, the cylinder 17 is retracted to switch the positions of the tape supporting arm 13 and the leader tape supporting arm 12. The cylinder 25 is advanced to rotate the tape catching arm 23 as shown in FIG. 4*b* and such catching arm 23 rotates the tape end portion which is pressed by the pressure pad 24 against the uplift 22'. The cylinder 20 is then retracted and causes the pressure pad 19 to release the tape 2. The motor 28 is started and the movable carrier 22 is elevated by means of the chain 27 to the upper end of its stroke. At the end of its stroke, the motor 28 is stopped and the carrier 22 stops its upward movement.

Figures 4C, 4D:
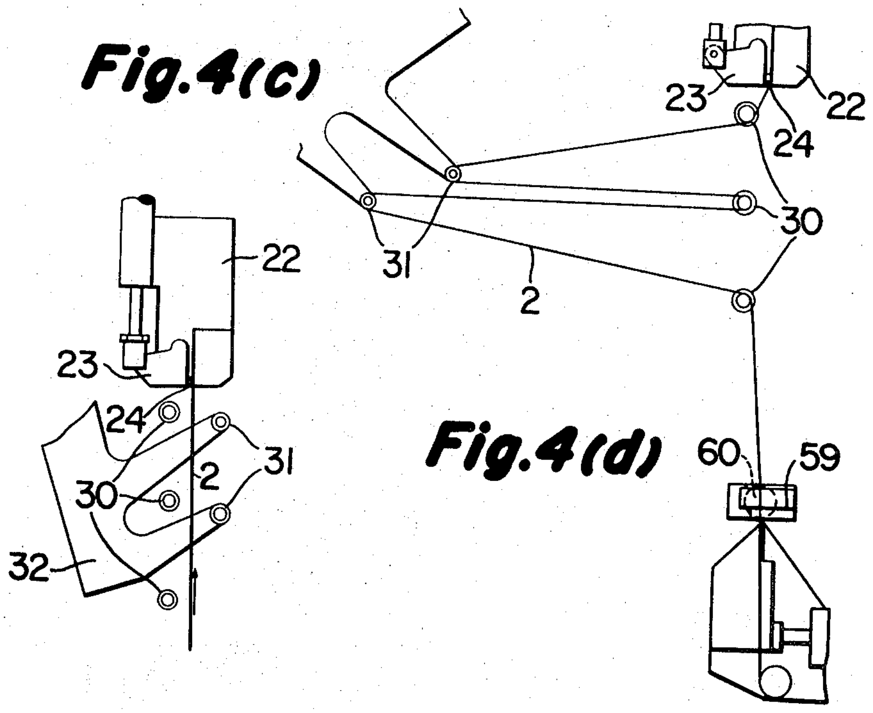

The tape 2 is extended as shown in FIG. 4*c* and the guide pins 30 project above the plate 1*a*. As the motor 34 is started, the tape pulling arm 32 rotates through transmission gear 33 in a clockwise direction to a predetermined position. As a result, the tape 2 is extended in a zigzag fashion along the guide pins 30 and 31 as shown in FIG. 4*d*. At this stage, the tape pad 19 advances to urge tape 2 against the tape supporting arm 13. After cutter 59 advances to cut the tape 2, such cutter 59 is retracted and the tape pulling arm 32 is rotated in a counterclockwise direction to its initial position. When the arm 32 has returned to its initial position, the motor 34 is stopped. Simultaneously, as the guide pins 30 emerge from the plate 36, the motor 38 starts its rotation in a reverse direction causing the carrier 22 to move downwardly. When the carrier 22 has reached its initial position, the motor 28 stops its rotation and the carrier 22 halts at this position. Thus, an unnecessary part of the tape 2 between the recorded parts (about 25 to 70cm in length) has been removed.

Figure 4E:
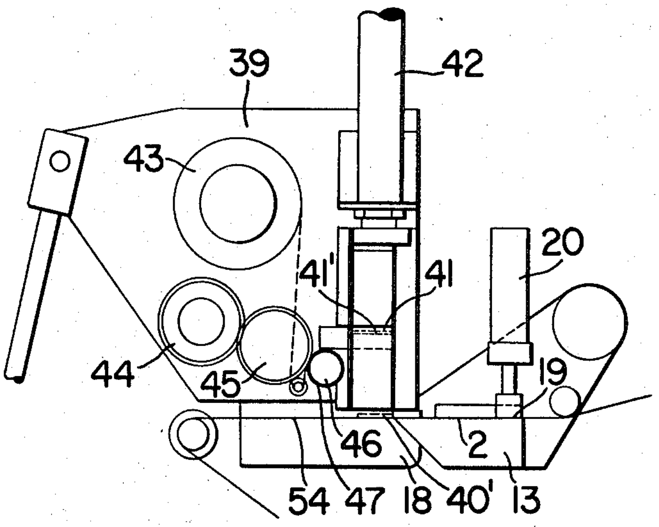
Figure 4F:
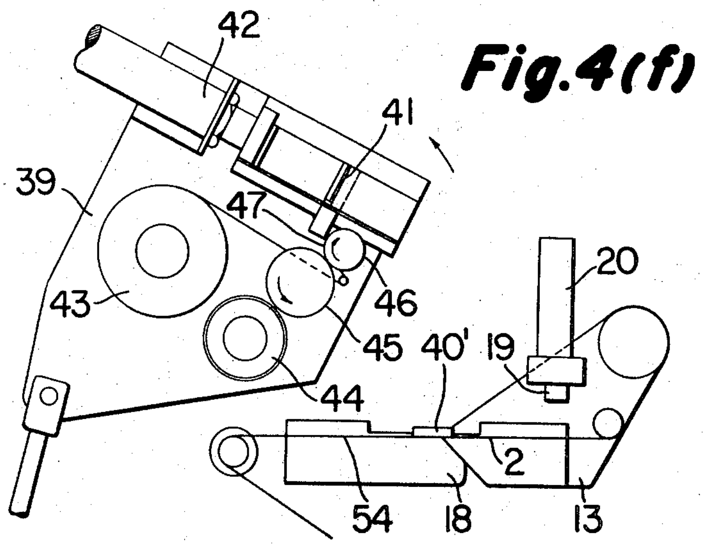

The operation to be described hereinafter is repeated until the tape 2 wound on the reel 1 is exhausted. The cassette pack 50 containing the leader tape 54 is loaded onto the frame 49. The leader tape 54 is drawn out of the cassette pack 50 and is passed around the fixed tape support 18, the leader tape supporting arm 12 and the guide roller 55 in a crossed belt arrangement. The cutter 37 is advanced by the operation of the cylinder 38 and severs the leader tape 54, after which the cutter 37 is retracted. When actuated cylinder 17 urges the leader tape supporting arm 12 and the tape supporting arm 13 to rotate such that the tape supporting arm 13 engages the fixed tape support 18 and the ends of the leader tape 54 and the tape 2 to come into abutting contact with each other. The cylinder 39*a* advances to rotate the adhesive tape supply arm 39 to a position shown in FIG. 4*e* such that the adhesive tape outlet is placed opposite to the abutting ends of the leader tape 54 and the tape 2. The cylinder 42 is simultaneously actuated to advance the pusher 41 and from the over-all adhesive tape 40, a predetermined length of adhesive tape is severed as determined by the cutter 41′, and urged against the abutting end portions of the leader tape 54 and the tape 2 via pusher 41. The leader tape 54 and the tape 2 are thus connected to each other by means of adhesive tape section 40′. As the cylinder 42 is retracted and the pusher 41 returns to its initial position, the cylinder 39*a* is retracted and the arm 39 is rotated in a counterclockwise direction. Since the sun gear 44 is not rotated, as shown in FIG. 4*f*, the transmission gear 45 and the planetary gear 46 are respectively rotated in the directions of the arrows. The feed roller 47 which is integral with the planetary gear 46, rotates in the same direction as the planetary gear 46, thereby allowing a predetermined length of adhesive tape 40 to be supplied to the pressing portion of the pusher 41; and the tape pad 19 is retracted via cylinder 20, enabling the tape 2 to be released. At this stage, the motor 52 starts to rotate the take-up shaft 51 and now take-up shaft 51 starts to wind the tape 2. Next, the pinch roller 10 is in an operable state and the motors 1′ and 9′ are rotated. As the winding operation progresses, the head 8 detects a signal indicating the end portion of the recorded section of the tape 2. The detection of the signal by the head 8 actuates an audio-sensing amplifier to in turn cause pinch roller 10 to pivot to its non-operable position and have motors 1′, 9′ and 52 stop.

Tape pad 19 advances via cylinder 20 in a manner to hold the tape 2 onto the tape supporting arm 13. Next, the cutter 37 advances through the operation of the cylinder 38 and severs tape 2 as the cutter 37 is retracted. The cylinder 17 is again actuated to switch the positions of the tape supporting arm 13 and the leader tape supporting arm 12, so that the terminal end of the tape 2 and the end of the leader tape 54 come into abutting contact with each other. Then the cylinder 39*a* is actuated to rotate the adhesive tape supply arm 39 to the position in which the outlet for the adhesive tape is opposed to the abutting end portions of the tape 2 and the leader tape 54. In a like manner, the previously mentioned steps for removing the unnecessary tape are affected at this stage. As cylinder 42 advances, pusher 41 moves and the adhesive tape 40 is cut into a section 40′ of predetermined length through cutter 41′. Such tape is then pressed against the abutting end portions of the tape 2 and the leader tape 54 by the pusher 41. Thus the tape 2 and the leader tape 54 are connected to one other and pusher 41 is retracted and the adhesive tape supply arm 39 is rotated counterclockwise to its intial position. The connected tape 2 and the leader tape 54 are disengaged from the fixed tape support 18, the leader tape supporting arm 12 and the guide roller 55 and the push button switch 56 is actuated to wind the tape 2 completely into the cassette pack 50. At this stage, the pinch roller 10 is in a non-operable position and the motors 1′, 9′ and 52 are stopped.

As controlling means for controlling the above described operations, various means including fluidics devices, electromagnetic means, cam means and limit switch means can be employed. The description of the controlling means will be omitted because the detailed construction of such controlling means are obvious to those skilled in the art. In the above embodiment, recorded tape wound on a master reel, is cut to a predetermined length and wound into a cassette; but this invention is not limited to recorded tapes; it is possible to apply equally as well to blank tapes. In the latter case, a member for severing the unnecessary portion of the tape is unnecessary, the means to measure the length of the tape to wind into a cassette, such as a counter connected to a capstan, is, however, necessary.

This invention has been disclosed with respect to certain preferred embodiments, and it will be understood that modifications and variations thereof will become obvious to persons skilled in the art and are intended to be included within the spirit and purview of this application and the scope of the appended claims.

What is claimed is:

1. An automatic tape winding assembly for loading a select amount of recorded tape into a cassette as said tape is being fed from a master tape supply; detecting means for detecting a prerecorded position signal on said tape, causing said tape travel to stop or start at a predetermined position responsive to said detected signal; tape transport guide means for guiding the tape being fed from said source of supply to said cassette; means for simultaneously causing excess unrecorded tape to be severed and removed away as said recorded tape is being loaded into said cassette, said assembly including: a rotatably mounted tape drive roller means; tape capstan means; said tape capstan means being in cooperative working relation with said tape drive roller means, to engage said tape along a line of travel of said tape; said tape drive roller means being responsive to said detected tape signals for respectively starting and stopping the travel of said tape; fixed tape support arm means; movable tape support arm means, said support arm means being operable to position said tape along at a designated place in its line of travel; tape holding means juxtapositionable with respect to said tape support arm means for engaging said tape in response to a tape stop signal detected by said tape drive roller means; tape severing means in proximity to each of said tape support arms for severing said tape at designated places along the course of tape travel; and tape engagement means for directing finally severed excessive tape away from said movable tape support arm means in a predefined path of travel.

2. An assembly as claimed in claim 1, wherein: said tape engagement means is provided with forked shaped rotatable tape pulling arm means having first tape directing means at the working ends thereof; said first tape directing guide means being in spaced working relation with a plurality of movable second tape directing guide means, such second guide means being movable in response to the rotation of said rotatable tape pulling arm means.

3. An assembly as claimed in claim 1, wherein: said first tape directing guide means are adapted to move and urge the extension of said tape in response to the rotation of said rotatable pulling arm means.

4. An assembly as claimed in claim 3, wherein: said rotatable pulling arm means is disposed in a horizontal plane between said second tape directing guide means.

5. An assembly as claimed in claim 1, wherein: said plurality of second tape directing guide means, being retractable elongated pins cooperating with said first tape directing guide means to form a zig-zag pattern as said excessive tape is being extended in response to the movement of said tape pulling arm means.

6. An assembly as claimed in claim 1, wherein: said rotatable pinch roller is disposed in working relation with a fixed capstan roller to fixedly engage said tape in response to a start signal and to disengage said tape, in response to a stop signal representing an end of tape travel signal.

* * * * *